United States Patent [19]

Sakano et al.

[11] 4,419,491

[45] Dec. 6, 1983

[54] THERMOPLASTIC RESIN COMPOSITION EXCELLENT IN COLOR DEVELOPMENT

[75] Inventors: Hajime Sakano, Osaka; Fumio Nakai, Shiga; Yukio Tomari, Osaka, all of Japan

[73] Assignee: Sumitomo Naugatuck Co., Ltd., Japan

[21] Appl. No.: 351,553

[22] Filed: Feb. 23, 1982

[30] Foreign Application Priority Data

Feb. 23, 1981 [JP] Japan .................................. 56-26000
Mar. 4, 1981 [JP] Japan .................................. 56-31715
Mar. 12, 1981 [JP] Japan .................................. 56-35870
Mar. 27, 1981 [JP] Japan .................................. 56-46078

[51] Int. Cl.$^3$ .................... C08L 51/04; C08L 69/00; C08L 33/12; C08L 25/12
[52] U.S. Cl. ........................................ 525/67; 525/71; 525/75; 525/80; 525/84
[58] Field of Search .................... 525/75, 80, 67, 71, 525/84

[56] References Cited

U.S. PATENT DOCUMENTS 4,000,219 12/1976 Smejkal .................................. 525/75
4,166,081  8/1979 Fournier et al. ...................... 525/75
4,172,103 10/1979 Serini et al. .......................... 525/80
4,276,391  6/1981 Hardt et al. .......................... 525/71

Primary Examiner—Carman J. Seccuro
Attorney, Agent, or Firm—Jones, Tullar & Cooper

[57] ABSTRACT

A thermoplastic resin composition with excellent color development which comprises (A) a graft polymer comprising an ethylene-propylene elastomeric polymer and units of at least two kinds of monomers chosen from aromatic vinyl compounds, vinyl cyanide compounds and other copolymerizable monomers grafted thereon, and if necessary, (A') a copolymer comprising units of at least two kinds of monomers chosen from aromatic vinyl compounds, vinyl cyanide compounds and other copolymerizable monomers in an amount of not more than 95% by weight based on the combined weight of the graft polymer (A) and the copolymer (A'), with (B) a methyl methacrylate polymer, the proportion of the combined weight of the graft polymer (A) and the copolymer (A') and the weight of the methyl methacrylate polymer being from 5:95 to 95:5.

10 Claims, No Drawings

THERMOPLASTIC RESIN COMPOSITION EXCELLENT IN COLOR DEVELOPMENT

The present invention relates to a thermoplastic resin composition excellent in color development. More particularly, it relates to a thermoplastic resin composition which can be colored in bright colors and does not produce any delamination while maintaining favorable weather resistance, impact resistance and processability.

Graft polymers which comprise ethylene-propylene elastomeric polymers and polymerizable monomers grafted thereon and their blend mixtures with other polymers (hereinafter referred to as "AES type resin(s)") have excellent weather resistance, impact resistance, chemical resistance, etc. and are used in various fields. These resins, however, have such disadvantages that the surfaces of their molded products are apt to produce delamination and flow marks and further that they are poor in color development and difficulty colored with bright colors.

ABS type resins (i.e. acrylonitrile-butadienestyrene polymers and their blend mixtures with other polymers), which have similar mechanical characteristics to AES type resins, are poorer in weather resistance but more excellent in color development than AES type resins. Thus, AES type resins could not be colored in deep black or bright colors such as red, yellow and blue. Further, the molded products are undesirable in that they show diffrent color development at a welded portion from that at an unwelded portion and also are difficult to color in metallic colors. Since AES type resins have much better weather resistance than ABS type resins, their molded products are usually not required to be treated or coated at the surfaces in order to avoid the weather influence. Thus, production of delamination and flow marks and poor color development are serious disadvantages for their practical use.

As a result of the extensive study, it has now been found that the above defects and disadvantages of AES type resins can be improved by incorporating therein certain specific resins in certain specific amounts.

According to the present invention, there is provided a thermoplastic resin composition which comprises (A) a graft polymer comprising an ethylene-propylene elastomeric polymer and units of at least two kinds of monomers chosen from aromatic vinyl compounds, vinyl cyanide compounds and other copolymerizable monomers grafted thereon and, if necessary, (A') a copolymer comprising units of at least two kinds of monomers chosen from aromatic vinyl compounds, vinyl cyanide compounds and other copolymerizable monomers in an amount of not more than 95% by weight based on the combined weight of the graft polymer (A) and the copolymer (A'), with (B) a methyl methacrylate polymer, the proportion of the combined weight of the graft polymer (A) and the copolymer (A') and the weight of the methyl methacrylate polymer being from 5:95 to 95:5, preferably of from 5:95 to 80:20. While such thermoplastic resin composition shows generally excellent color development, does not produce any delamination and has favorable weather resistance, impact strength and processability, it may comprise additionally (C) any other polymer or resin in order to improve or enhance any physical property.

The graft polymer as the component (A) comprises an ethylene-propylene elastomeric polymer grafted with at least two kinds of monomers chosen from aromatic vinyl compounds, vinyl cyanide compounds and other copolymerizable monomers.

The ethylene-propylene elastomeric polymer may be a copolymer of ethylene and propylene (EPR), a copolymer of ethylene and propylene and at least one non-conjugated diene monomer (EPDM), etc. Examples of the non-conjugated diene monomer are dicyclopentadiene, ethylidene-norbornene, 1,4-hexadiene, 1,4-cycloheptadiene, 1,5-cyclooctadiene, etc. The molar proportion of units of ethylene and of propylene in the ethylene-propylene elastomeric polymer is usually from 5:1 to 1:3. When units of at least one non-conjugated diene monomer are present, their content may be preferably the one equivalent to an iodine value of about 2 to 50.

The monomers to be grafted onto the ethylene-propylene elastomeric polymer are at least two kinds of monomers, of which the first one is chosen from (a) aromatic vinyl compounds, (b) vinyl cyanide compounds and (c) other copolymerizable monomers and the second one is chosen from the groups other than the group, from which the first one is chosen. Examples of the aromatic vinyl compounds as the group (a) are styrene, α-methylstyrene, α-chlorostyrene, vinyltoluene, etc. Among them, styrene is the most preferred. Examples of the vinyl cyanide compounds as the group (b) are acrylonitrile, methacrylonitrile, etc. Preferred is acrylonitrile. Examples of the other copolymerizable monomers as the group (c) are methyl acrylate, ethyl acrylate, propyl acrylate, butyl acrylate, pentyl acrylate, hexyl acrylate, methyl methacrylate, ethyl methacrylate, propyl methacrylate, butyl methacrylate, pentyl methacrylate, hexyl methacrylate, etc., among which methyl methacrylate is particularly favorable. The weight proportion of the ethylene-propylene elastomeric polymer and the monomers to be grafted thereon may be appropriately decided on the purpose and is usually from 5:95 to 70:30, preferably from 45:55 to 60:40. As to the weight proportion among the three groups of monomers, any particular limitation is not present.

The copolymer as the component (A') may comprise units of at least two kinds of monomers chosen from (a) aromatic vinyl compounds, (b) vinyl cyanide compounds and (c) other copolymerizable monomers. Specific examples of these monomers are as exemplified above with respect to the monomers to be grafted on the ethylene-propylene elastomeric polymer. Any specific limitation is not present on the weight proportion of these monomers, but it is preferred that the weight ratio of the aromatic vinyl compounds (a) to the vinyl cyanide compounds (b) and/or the other copolymerizable monomers (c) is from 55:45 to 85:15. The copolymer (A') may have usually an intrinsic viscosity of about 0.40 to 1.10 (determined in dimethylformamide at 30° C.), although this is not critical. When the intrinsic viscosity is not within the said range, the ultimate thermoplastic resin composition may be lowered in impact strength and processability and produce delamination.

Production of the graft polymer (A) and the copolymer (A') may be accomplished by conventional polymerization procedures such as suspension polymerization, bulk polymerization, emulsion polymerization and solution polymerization.

In the thermoplastic resin composition of the invention, the weight proportion of the graft polymer (A) and, when used, the copolymer (A') is to be from about 100:0 to about 5:95. When the copolymer (A') is used, its content may be not more than 95% by weight on the basis of the combined amount of the graft polymer (A) and the copolymer (A'). When the content is more than 95% by weight, the impact resistance of the ultimate thermoplastic resin composition is inferior. In order to achieve favorable color development and processability, its content is preferred to be from about 20 to 90% by weight.

The methyl methacrylate polymer as the component (B) may be a homopolymer of methyl methacrylate or a copolymer of methyl methacrylate with at least one of other polymerizable monomers such as alkyl acrylates (e.g. ethyl acrylate, butyl acrylate), aromatic vinyl compounds (e.g. styrene, α-methylstyrene) and vinyl cyanide compounds (e.g. acrylonitrile, methacrylonitrile). In case of the copolymer, the content of units of methyl methacrtylate is usually not less than 30% by weight, preferably not less than 50% by weight, on the basis of the weight of the copolymer. When the content is less than 30% by weight, the improvement of color development will be hardly attained.

In the thermoplastic resin composition of the invention, the proportion of the combined weight of the component (A) and, when used, the component (A') and the weight of the component (B) is usually from 5:95 to 95:5, preferably from 5:95 to 80:20. When the amount of the component (B) is larger than the upper limit, the impact resistance of the ultimate thermoplastic resin composition is lowered. In addition, the compatibility of the component (B) with the component (A) is deteriorated, and the molded product shows pearlescence at the surface. Thus, good color development is not obtainable. When the amount of the component (B) is smaller than the lower limit, the drawbacks such as delamination and insufficient color development can not be solved.

When higher improvement or enhancement of any physical property of the thermoplastic resin composition is desired, any other polymer or resin as the component (C) may be incorporated therein usually in an amount of 0.5 to 400 parts by weight to 100 parts by weight of the combined amount of the components (A), (A') and (B).

For instance, the incorporation of (C-1) a diene rubber graft copolymer is effective in enhancement of the impact resistance at low temperatures. The diene rubber graft copolymer (C-1) comprises a diene rubbery polymer and units of at least two kinds of monomers chosen from (a) aromatic vinyl compounds, (b) vinyl cyanide compounds and (c) other copolymerizable monomers graft copolymerizable thereon. Examples of the diene rubbery polymer are polybutadiene, styrene-butadiene copolymer, acrylonitrile-butadiene copolymer, etc. Examples of the monomers to be grafted on the diene rubbery polymer are those as exemplified with respect to the monomers to be grafted on the ethylene-propylene polymer. The weight proportion of the diene rubbery polymer and the monomers to be graft polymerized thereon may be from 5:95 to 80:20. The proportion of the weight of the aromatic vinyl compounds (a) and the combined weight of the vinyl cyanide compounds (b) and the other copolymerizable monomers (c) may be from 50:50 to 80:20. Production of the diene rubber graft copolymer may be accomplished by a conventional polymerization procedure such as emulsion polymerization, suspension polymerization, bulk polymerization or solution polymerization.

The proportion of the combined weight of the component (A) and, when used, the component (A') with the component (B) and the weight of the component (C-1) may be usually from 100:0.5–30. When the amount of the component (C-1) is larger than the upper limit, the weather resistance is deteriorated. When the amount of the component (C-1) is smaller than the lower limit, the impact resistance at low temperatures will become inferior.

Further, for instance, the incorporation of (C-2) a polycarbonate resin is effective in enhancement of color development and impact resistance. As the polycarbonate resin (C-2), there are exemplified aromatic polycarbonates, aliphatic polycarbonates, aliphatic-aromatic polycarbonates, etc. Specifically, there may be used any one chosen from homopolymers and copolymers of 2,2-bis(4-hydroxyphenyl)alkanes, bis(4-hydroxyphenyl)ether, bis(4-hydroxyphenyl)sulfone, bis(4-hydroxyphenyl)sulfide, bis(4-hydroxyphenyl)sulfoxide, etc.

The proportion of the combined weight of the component (A) and, when used, the component (A') with the component (B) and the weight of the component (C-2) may be ordinarily from 80:20 to 20:80. When the amount of the component (C-2) is larger than the upper limit, delamination will be produced, and color development and impact resistance become inferior. When smaller than the lower limit, color development and impact resistance will be lowered.

Furthermore, for instance, the incorporation of (C-3) a vinyl chloride resin is effective in enhancement of color development and impact resistance. As the vinyl chloride resin, there may be used any one chosen from homopolymers of vinyl chloride and copolymers of vinyl chloride with at least one other copolymerizable monomer. Specific examples are polyvinyl chloride, vinyl acetate-vinyl chloride copolymer, ethylene-vinyl acetate-vinyl chloride copolymer, alkyl acrylate-vinyl chloride copolymer, ethylene-vinyl chloride copolymer, propylene-vinyl chloride copolymer, etc.

The proportion of the combined weight of the component (A) and, when used, the component (A') with the component (B) and the weight of the component (C-3) may be normally from 80:20 to 20:80. When the amount of the component (C-3) is larger than the upper limit, delamination is produced, and color development and impact resistance become inferior. When smaller than the lower limit, color development and impact resistance will be lowered.

Mixing of the component (A) and, when used, the component (A') with the component (B) and, when used, the component (C) may be accomplished by the aid of a conventional mixing apparatus such as a Banbury mixer or an extruder.

On the mixing, any conventional dyestuff or pigment may be incorporated, whereby excellent color development is produced in the resulting thermoplastic resin composition. Other conventional additives such as stabilizers, plasticizers, antistatic agents, ultraviolet ray absorbers, lubricants and fillers may be also incorporated therein.

The thus obtained thermoplastic resin composition may be molded in an appropriate shape by any conventional molding procedure such as extrusion molding or injection molding.

Practical and presently preferred embodiments of the invention will be illustratively shown in the following Examples wherein part(s) and % are by weight, unless otherwise indicated.

EXAMPLES 1 TO 4 AND COMPARATIVE EXAMPLES 1 TO 5

Graft polymer (A)

EPDM (370 parts) comprising 43% of units of propylene and having units of ethylidene-norbornene as the diene monomer component, the iodine value being 8.5 and the Mooney viscosity being 61, was dissolved in a mixed solvent of n-hexane (3000 parts) and ethylene chloride (1500 parts), and styrene (250 parts), acrylonitrile (130 parts) and benzoyl peroxide (13 parts) were added thereto. Polymerization was carried out under a nitrogen atmosphere at 67° C. for 10 hours. The reaction mixture was contacted with a large excess of methanol. The precipitate was collected and dried to give a graft polymer (elastomer content, about 49%).

COPOLYMER (A')

Copolymer (A'-1)

To a mixture of styrene (70 parts) and acrylonitrile (30 parts), t-dodecylmercaptan (0.1 part) was added, and pre-polymerization was carried out in a bulk state at 90° C. for 3 hours. Then, water (210 parts), methylcellulose (1.0 part) and benzoyl peroxide (0.3 part) were added thereto. Polymerization was carried out in an aqueous medium for 10 hours, during which the temperature was raised from 30° C. to 90° C. By removal of water from the reaction mixture, there was obtained a copolymer (intrinsic viscosity, 0.50 (in dimethylformamide at 30° C.)).

Copolymer (A'-2)

As the copolymer (A'-2), commercially available styrene-acrylonitrile copolymer (intrinsic viscosity, 0.63; "Cevian NJD" manufactured by Daicel Chemical Industries, Ltd.) was used.

METHYL METHACRYLATE POLYMER (B)

As the methyl methacrylate polymer (B), commercially available polymethyl methacrylate ("Sumipex B-LG" manufactured by Sumitomo Chemical Co., Ltd.) was used.

PREPARATION OF THERMOPLASTIC RESIN COMPOSITION

The graft polymer (A), the copolymers (A'-1) and (A'-2) and the methyl methacrylate polymer (B) were mixed together with the following dyestuff or pigment by the aid of a Banbury mixer at 200° C. for 4 minutes to obtain a thermoplastic resin composition:

|   | Dyestuff or Pigment | Part(s)*[1] |
|---|---|---|
| Red: | Chromophthal red | 0.3 |
| Blue: | Ultramarine #2000 | 0.3 |
| Black: | Carbon #45 | 1.5 |

Note:
*[1]Based on 100 parts of the combined amount of the graft polymer (A), the copolymers (A'-1) and (A'-2) and the methyl methacrylate polymer (B).

The composition was molded under the following conditions to obtain a sample piece: molding machine, N-140 type injection molding machine (7 oz/shot capacity; manufactured by Japan Steel Works, Ltd.); molding temperature, 230° C.; injection speed, FCV8; injection pressure, 100 kg/cm$^2$G.

In the same manner as above but using commercially available ABS resin ("Kralastic MH" manufactured by Sumitomo Naugatuck Co., Ltd), the standard sample was prepared.

Color development and delamination of the samples were observed, and the mechanical properties such as impact strength and processability and the weather resistance were measured. The results are shown in Table 1.

TABLE 1

|   |   | ABS resin | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|---|
| (I) | Graft polymer (A) + Copolymer(s) (A') (part(s)) |   | 80 | 70 | 80 | 75 | 50 | 2 | 90 | 90 | 100 |
|   | Graft polymer (A) (%) |   | 100 | 100 | 75 | 65 | 2 | 100 | 100 | 50 | 100 |
|   | Copolymer (A'-1) (%) |   | 0 | 0 | 25 | 0 | 98 | 0 | 0 | 0 | 0 |
|   | Copolymer (A'-2) (%) |   | 0 | 0 | 0 | 35 | 0 | 0 | 0 | 50 | 0 |
| (II) | Methyl methacrylate polymer (B) (part(s)) |   | 20 | 30 | 20 | 25 | 50 | 98 | 10 | 10 | 0 |
| Color development | Red ($\Delta E$)*[1] |   | 1.2 | 1.1 | 0.9 | 0.9 | >10 | 1.6 | 7.0 | 6.5 | 6.8 |
|   | Blue ($\Delta E$)*[1] |   | 1.5 | 1.2 | 0.9 | 0.9 | >10 | 2.0 | 7.3 | 7.0 | 7.3 |
|   | Black (depth, visual color judgement) | Good | Good | Good | Good | Good | Not good | Good | Not good | Not good | Not good |
| Delamination |   | None | None | None | None | None | Observed | Slightly observed | Observed | Observed | Observed |
| Mechanical property | Impact resistance (notched izod impact strength) (kg.cm/cm) | 21.5 | 37.5 | 35.0 | 33.0 | 32.5 | 2.1 | 2.0 | 45.5 | 28.5 | 48.7 |
|   | Processability (Koka type flow tester, 210° C., 30 kg/cm$^2$) (ml/min) | 0.20 | 0.05 | 0.06 | 0.08 | 0.08 | 0.15 | 0.08 | 0.05 | 0.06 | 0.05 |
| Weather resistance | Retention of impact strength (⅛", not notched, −30° C.) after 1000 hours exposure to weatherometer (%) | 5 | 81 | 83 | 80 | 80 | — | — | 77 | 77 | 75 |
|   | Retention of surface gloss after 1000 hours exposure | 5 | 83 | 85 | 83 | 83 | 85 | 86 | 82 | 80 | 80 |

TABLE 1-continued

|  | ABS resin | Example | | | | Comparative Example | | | | |
|---|---|---|---|---|---|---|---|---|---|---|
|  |  | 1 | 2 | 3 | 4 | 1 | 2 | 3 | 4 | 5 |
| to weatherometer (%) | | | | | | | | | | |

Note:
Color difference between the standard ABS resin sample and the test sample.

EXAMPLES 5 TO 8 AND COMPARATIVE EXAMPLES 6 TO 10

Graft polymer (A)

The graft polymer (A) was prepared in the same manner as in Examples 1 to 4.

COPOLYMER (A')

Copolymer (A'-1)

The copolymer (A'-1) was prepared in the same manner as in Examples 1 to 4.

Copolymer (A'-2)

As the copolymer (A'-2), commercially available styrene-acrylonitrile copolymer (intrinsic viscosity, 0.63; "Cevian NJD" manufactured by Daicel Chemical Industries, Ltd.) was used.

METHYL METHACRYLATE POLYMER (B)

As the methyl methacrylate polymer (B), commercially available polymethyl methacrylate ("Sumipex B-LG" manufactured by Sumitomo Chemical Co., Ltd.) was used.

DIENE RUBBER GRAFT COPOLYMER (C-1)

To a mixture of polybutadiene (solid content, 50 parts), potassium persulfate (0.5 part), potassium oleate (0.5 part) and t-dodecylmercaptan (0.13 part), styrene (36 parts) and acrylonitrile (14 parts) were added, and polymerization was carried out at 70° C. for 3 hours, followed by aging for 1 hour. The reaction mixture was salted out, dehydrated and dried to give a diene rubber graft copolymer.

PREPARATION OF THERMOPLASTIC RESIN COMPOSITION

The graft polymer (A), the copolymers (A'-1) and (A'-2), the methyl methacrylate polymer (B) and the diene rubber graft copolymer (C-1) were mixed together with the following dyestuff or pigment by the aid of a Bumbury mixer at 200° C. for 4 minutes to obtain a thermoplastic resin composition:

| Dyestuff or pigment | | Part(s)*[1] |
|---|---|---|
| Red: | Chromophthal red | 0.3 |
| Blue: | Ultramarine #2000 | 0.3 |
| Black: | Carbon#45 | 1.5 |

Note:
*[1] Based on 100 parts of the combined amount of the graft polymer (A), the copolymers (A'-1) and (A'-2), the methyl methacrylate polymer (B) and the diene rubber graft copolymer (C-1).

The composition was molded under the following conditions to obtain a sample piece: molding machine, N-140 type injection molding machine (7 oz/shot capacity; manufactured by Japan Steel Works, Ltd.); molding temperature, 230° C.; injection speed, FCV8; injection pressure, 100 kg/cm$^2$G.

In the same manner as above but using commercially available ABS resin ("Kralastic MV" manufactured by Sumitomo Naugatuck Co., Ltd), the standard sample was prepared.

Color development and delamination of the samples were observed, and the mechanical properties such as impact strength and processing properties and the weather resistance measured. The results are shown in Table 2.

TABLE 2

|  |  |  | ABS resin | Example | | | | Comparative Example | | | | |
|---|---|---|---|---|---|---|---|---|---|---|---|---|
|  |  |  |  | 5 | 6 | 7 | 8 | 6 | 7 | 8 | 9 | 10 |
| (I) | Graft polymer (A) + Copolymer(s) (A') (part(s)) | | | 80 | 70 | 80 | 75 | 80 | 70 | 98 | 3 | 100 |
|  | Graft polymer (A) (%) | | | 100 | 100 | 75 | 65 | 100 | 100 | 100 | 100 | 100 |
|  | Copolymer (A'-1) (%) | | | 0 | 0 | 25 | 0 | 0 | 0 | 0 | 0 | 0 |
|  | Copolymer (A'-2) (%) | | | 0 | 0 | 0 | 35 | 0 | 0 | 0 | 0 | 0 |
| (II) | Methyl methacrylate polymer (B) (part(s)) | | | 20 | 30 | 20 | 25 | 20 | 3 | 2 | 97 | 0 |
|  | (I) / (II) | | | 80/20 | 70/30 | 80/20 | 75/25 | 80/20 | 70/30 | 98/2 | 3/97 | 100/0 |
| (III) | Diene rubber graft copolymer (C-1) (part(s)) | | | 15 | 5 | 10 | 7 | 0 | 45 | 10 | 10 | 0 |
|  | (I) + (II) / (III) | | | 100/15 | 100/5 | 100/10 | 100/7 | 100/0 | 100/45 | 100/10 | 100/10 | 100/0 |
| Color development | Red (ΔE)*[1] | | | 1.1 | 1.0 | 1.0 | 1.1 | 1.2 | 1.4 | 7.0 | 1.5 | 6.8 |
|  | Blue (ΔE*[1]) | | | 1.3 | 1.3 | 1.2 | 1.2 | 1.5 | 1.7 | 7.3 | 2.0 | 7.3 |
|  | Black (depth, visual color judgement) | Good | Good | Good | Good | Good | Good | Good | Not good | Good | Not good |
| Delamination | | | None | None | None | None | None | None | None | Observed | Observed | Observed |
| Mechanical property | Impact resistance (20° C.) (notched izod impact strength) (kg.cm/cm) | | 31.5 | 51.5 | 49.0 | 45.0 | 41.0 | 37.5 | 58.0 | 52.0 | 5.1 | 48.7 |

TABLE 2-continued

|  |  | ABS resin | Example | | | | Comparative Example | | | | |
|---|---|---|---|---|---|---|---|---|---|---|---|
|  |  |  | 5 | 6 | 7 | 8 | 6 | 7 | 8 | 9 | 10 |
|  | Impact resistance (−30° C.) (notched izod impact strength) (kg.cm/cm) | 24.5 | 26.0 | 22.0 | 20.3 | 20.0 | 9.8 | 34.0 | 26.5 | 2.1 | 10.8 |
|  | Processability (Koka type flow tester, 210° C., 30 kg/cm$^2$) (ml/min) | 0.06 | 0.05 | 0.04 | 0.06 | 0.05 | 0.05 | 0.03 | 0.04 | 0.06 | 0.05 |
| Weather resistance | Retention of impact strength (⅛″, not notched, −30° C.) after 1000 hours exposure to weatherometer (%) | 5 | 75 | 78 | 76 | 78 | 81 | 11 | 77 | — | 75 |
|  | Retention of surface gloss after 1000 hours exposure to weatherometer (%) | <5 | 80 | 81 | 81 | 81 | 83 | 6.8 | 80 | 80 | 80 |

Note:
Color difference between the standard ABS resin sample and the test sample.

EXAMPLES 9 TO 11 AND COMPARATIVE EXAMPLES 11 TO 13

Graft polymer (A)

The graft polymer (A) was prepared in the same manner as in Examples 1 to 4.

Copolymer (A'-1)

The copolymer (A'-1) was prepared in the same manner as in Examples 1 to 4.

METHYL METHACRYLATE POLYMER (B)

As the methyl methacrylate polymer (B), commercially available polymethyl methacrylate ("Sumipex B-LG" manufactured by Sumitomo Chemical Co., Ltd.) was used.

POLYCARBONATE RESIN (C-2)

As the polycarbonate resin (C-2), there was used commercially available polycarbonate resin ("Panlite 1250W" manufactured by Teijin Ltd.).

PREPARATION OF THERMOPLASTIC RESIN COMPOSITION

The graft polymer (A), the copolymer (A'-1), the methyl methacrylate polymer (B) and the polycarbonate resin (C-2) were mixed together with the following dyestuff or pigment by the aid of a Banbury mixer at 200° C. for 4 minutes to obtain a thermoplastic resin composition:

| Dyestuff or pigment | | Part(s)*[1] |
|---|---|---|
| Red: | Chromophthal red | 0.3 |
| Blue: | Ultramarine #2000 | 0.3 |
| Black: | Carbon #45 | 1.5 |

Note:
*[1] Based on 100 parts of the combined amount of the graft polymer (A), the copolymer (A'-1), the methyl methacrylate polymer (B) and the polycarbonate resin (C-2).

The composition was molded under the following conditions to obtain a sample piece: molding machine, N-140 type injection molding machine (7 oz/shot capacity; manufactured by Japan Steel Works, Ltd.); molding temperature, 230° C.; injection speed, FCV8; injection pressure, 100 kg/cm$^2$G.

In the same manner as above but using commercially available ABS resin ("Kralastic MH" manufactured by Sumitomo Naugatuck Co., Ltd), the standard sample was prepared.

Color development and delamination of the samples were observed, and the mechanical properties such as impact strength and processing properties and the weather resistance measured. The results are shown in Table 3.

TABLE 3

|  |  |  | ABS Resin | Example | | | Comparative Example | | |
|---|---|---|---|---|---|---|---|---|---|
|  |  |  |  | 9 | 10 | 11 | 11 | 12 | 13 |
| (I) | Graft polymer (A) + Copolymer(s) (A') (part(s)) |  |  | 30 | 40 | 40 | 55 | 70 | 9 |
|  | Graft polymer (A) (%) |  |  | 100 | 70 | 50 | 100 | 85 | 60 |
|  | Copolymer (A'-1) (%) |  |  | 0 | 30 | 50 | 0 | 15 | 40 |
| (II) | Methyl methacrylate polymer (B) (part(s)) |  |  | 25 | 30 | 35 | 0 | 15 | 6 |
|  | (I) / (II) |  |  | 54.5/45.5 | 57/43 | 57/43 | — | 82/18 | 60/40 |
| (III) | Polycarbonate resin (C-2) (part(s)) |  |  | 45 | 30 | 25 | 45 | 15 | 85 |
|  | (I) + (II) / (III) |  |  | 55/45 | 70/30 | 75/25 | 55/45 | 85/15 | 15/85 |
| Color development | | Red (ΔE)*[1] |  | 1.3 | 1.1 | 1.0 | 7.8 | 1.8 | 3.0 |
|  |  | Blue (ΔE)*[1] |  | 1.4 | 1.2 | 1.1 | 9.0 | 2.2 | 3.5 |
|  |  | Black (depth, visual color judgement | Good | Good | Good | Good | Not good | Good | Good |
| Delamination |  |  |  | None | None | None | Observed | None | Observed |
| Mechanical property |  | Impact resistance (20° C.) | 21.5 | 49.8 | 47.5 | 45.0 | 47.5 | 24.6 | 14.5 |

TABLE 3-continued

|  |  | ABS Resin | Example | | | Comparative Example | | |
|---|---|---|---|---|---|---|---|---|
|  |  |  | 9 | 10 | 11 | 11 | 12 | 13 |
|  | (notched izod impact strength) (kg.cm/cm) |  |  |  |  |  |  |  |
|  | Processability (Koka type flow tester, 230° C., 60 kg/cm$^2$) (ml/min) | 1.7 | 0.55 | 0.65 | 0.70 | 0.53 | 0.40 | 0.60 |
|  | Heat resistance (heat deformation temperature, 264 psi, no annealing) (°C.) | 83.4 | 105 | 100 | 98 | 106 | 86.4 | 115 |
| Weather resistance | Retention of impact strength (⅛", not notched, −30° C.) after 1000 hours exposure to weatherometer (%) | 5 | 83 | 85 | 85 | 85 | 82 | — |
|  | Retention of surface gloss after 1000 hours exposure to weatherometer (%) | <5 | 85 | 87 | 86 | 87 | 85 | 79 |

Note: Color difference between the standard ABS resin sample and the test sample.

EXAMPLES 12 TO 14 AND COMPARATIVE EXAMPLES 14 TO 16

Graft polymer (A)

The graft polymer (A) was prepared in the same manner as in Examples 1 to 4.

COPOLYMER (A'-1)

The copolymer (A'-1) was prepared in the same manner as in Examples 1 to 4.

METHYL METHACRYLATE POLYMER (B)

As the methyl methacrylate polymer (B), commercially available polymethyl methacrylate ("Sumipex B-LG" manufactured by Sumitomo Chemical Co., Ltd.) was used.

VINYL CHLORIDE RESIN (C-3)

As the vinyl chloride resin (C-3), there was used commercially available polyvinyl chloride ("Sumilit SX-7G" manufactured by Sumitomo Chemical Co., Ltd.).

PREPARATION OF THERMOPLASTIC RESIN COMPOSITION

The graft polymer (A), the copolymer (A'-1), the methyl methacrylate polymer (B) and the vinyl chloride resin (C-3) were mixed together with the following dyestuff or pigment by the aid of a Banbury mixer at 200° C. for 4 minutes to obtain a thermoplastic resin composition:

| Dyestuff or pigment | | Part(s)*(1) |
|---|---|---|
| Red: | Chromophthal red | 0.3 |
| Blue: | Ultramarine #2000 | 0.3 |
| Black: | Carbon #45 | 1.5 |

Note:
*(1) Based on 100 parts of the combined amount of the graft polymer (A), the copolymer (A'-1), the methyl methacrylate polymer (B) and the vinyl chloride resin (C-3).

The composition was molded under the following conditions to obtain a sample piece: molding machine, N-140 type injection molding machine (7 oz/shot capacity; manufactured by Japan Steel Works, Ltd.); molding temperature, 230° C.; injection speed, FCV8; injection pressure, 100 kg/cm$^2$G.

In the same manner as above but using commercially available ABS resin ("Kralastic MH" manufactured by Sumitomo Naugatuck Co., Ltd), the standard sample was prepared.

Color development and delamination of the samples were observed, and the mechanical properties such as impact strength and processing properties and the weather resistance measured. The results are shown in Table 4.

TABLE 4

|  |  | ABS resin | Example | | | Comparative Example | | |
|---|---|---|---|---|---|---|---|---|
|  |  |  | 12 | 13 | 14 | 14 | 15 | 16 |
| (I) | Graft polymer (A) + Copolymer(s) (A') (part(s)) |  | 40 | 40 | 55 | 60 | 70 | 44 |
|  | Graft polymer (A) (%) |  | 100 | 70 | 50 | 80 | 80 | 95 |
|  | Copolymer (A'-1) (%) |  | 0 | 30 | 50 | 20 | 20 | 5 |
| (II) | Methyl methacrylate polymer (B) (part(s)) |  | 20 | 20 | 20 | 0 | 20 | 1 |
|  | (I) / (II) |  | 66.7/33.3 | 66.7/33.3 | 73.3/26.5 | — | 77.8/22.2 | 97.8/2.2 |
| (III) | Vinyl chloride resin (C-3) (part(s)) |  | 40 | 40 | 25 | 40 | 15 | 55 |
|  | (I) + (II) / (III) |  | 60/40 | 60/40 | 75/25 | 60/40 | 90/10 | 45/55 |
| Color development | Red (ΔE)*(1) |  | 1.5 | 1.4 | 1.2 | 7.0 | 1.7 | 10 |
|  | Blue (ΔE)*(1) |  | 1.4 | 1.3 | 1.0 | 7.8 | 2.0 | 10 |

TABLE 4-continued

|  |  | ABS resin | Example | | | Comparative Example | | |
| --- | --- | --- | --- | --- | --- | --- | --- | --- |
|  |  |  | 12 | 13 | 14 | 14 | 15 | 16 |
|  | Black (depth, visual color judgement | Good | Good | Good | Good | Not good | Good | Not good |
| Delamination |  | None | None | None | None | Observed | None | Observed |
| Mechanical property | Impact resistance (20° C.) (notched izod impact strength) (kg.cm/cm) | 21.5 | 73.5 | 64.8 | 50.5 | 51.5 | 18.5 | 42.5 |
|  | Processability (Koka type flow tester, 210° C., 30 kg/cm$^2$) (ml/min) | 0.15 | 0.04 | 0.06 | 0.10 | 0.05 | 0.03 | 0.06 |
|  | Heat resistance (heat deformation temperature, 264 psi, no annealing) (°C.) | 83.4 | 75.0 | 76.5 | 77.0 | 76.0 | 76.0 | 74.5 |
| Weather resistance | Retention of impact strength (⅛", not notched, −10° C.) after 1000 hours exposure to weatherometer (%) | 5 | 80 | 81 | 83 | 80 | 80 | 72 |
|  | Retention of surface gloss after 1000 hours exposure to weatherometer | <5 | 82 | 83 | 85 | 81 | 83 | 76 |

Note:
Color difference between the standard ABS resin sample and the test sample.

What is claimed is:

1. A thermoplastic resin composition which comprises
   (A) a graft polymer comprising an ethylene-propylene elastomeric polymer and units of at least two kinds of monomers chosen from aromatic vinyl compounds, vinyl cyanide compounds and other copolymerizable monomers grafted thereon and,
   (A') a copolymer consisting of copolymerized monomer units comprising at least one aromatic vinyl compound and at least one vinyl cyanide compound and other copolymerizable monomers in a weight proportion of 55:45 to 85:15 and having an intrinsic viscosity of 0.40 to 1.10 (determined in dimethylformamide at 30° C.),
the weight proportion of the graft polymer (A) and the copolymer (A') being from 5:95 to 80:20, with
   (B) a methyl methacrylate polymer consisting of copolymerized monomer units comprising at least about 50% by weight methyl methacrylate units,
the proportion of the combined weight of the graft polymer (A) and the copolymer (A') and the weight of the methyl methacrylate polymer (B) being from 5:95 to 95:5.

2. The thermoplastic resin composition according to claim 1, wherein the proportion of the combined weight of the graft polymer (A) and the copolymer (A') and the weight of the methyl methacrylate polymer (B) is from 5:95 to 80:20.

3. A thermoplastic resin composition according to claims 1 or 2 wherein the methyl methacrylate polymer (B) is a homopolymer of methyl methacrylate or a copolymer of methyl methacrylate and at least one copolymerizable monomer containing unit of methyl methacrylate in an amount of not less than 50% by weight based on the copolymer.

4. The thermoplastic resin composition according to claim 1 or 2, which further comprises (C) any other polymer or resin in an amount of 0.5 to 400 parts by weight to 100 parts of the total amount of the graft polymer (A), the copolymer (A') and the methyl methacrylate polymer (B).

5. The thermoplastic resin composition according to claim 4, wherein the polymer or resin (C) is a diene rubber graft copolymer.

6. The thermoplastic resin composition according to claim 5, wherein the diene rubber graft copolymer is included in an amount of 0.5 to 30 parts by weight to 100 parts by weight of the total amount of the graft polymer (A), the copolymer (A') and the methyl methacrylate polymer (B).

7. The thermoplastic resin composition according to claim 4, wherein the polymer or resin (C) is a polycarbonate resin chosen from homopolymers and copolymers of 2,2-bis(4-hydroxyphenyl)alkanes, bis(4-hydroxyphenyl)ether, bis(4-hydroxyphenyl)sulfone, bis(4-hydroxyphenyl)sulfide and bis(4-hydroxyphenyl)sulfoxide.

8. The thermoplastic resin composition according to claim 7, wherein the polycarbonate resin is included in an amount of 25 to 400 parts by weight to 100 parts by weight of the total amount of the graft polymer (A), the copolymer (A') and the methyl methacrylate polymer (B).

9. The thermoplastic resin composition according to claim 4, wherein the polymer or resin (C) is a vinyl chloride resin.

10. The thermoplastic resin composition according to claim 9, wherein the vinyl chloride resin is included in an amoutn of 25 to 400 parts by weight to 100 parts by weight of the total amount of the graft polymer (A), the copolymer (A') and the methyl methacrylate polymer (B).

* * * * *